May 6, 1930.  W. A. STARCK  1,757,268

AUTOMOBILE BUMPER

Filed Feb. 8, 1928  2 Sheets-Sheet 1

Inventor:
William A. Starck.
By Edwin B. H. Tower Jr.
Atty.

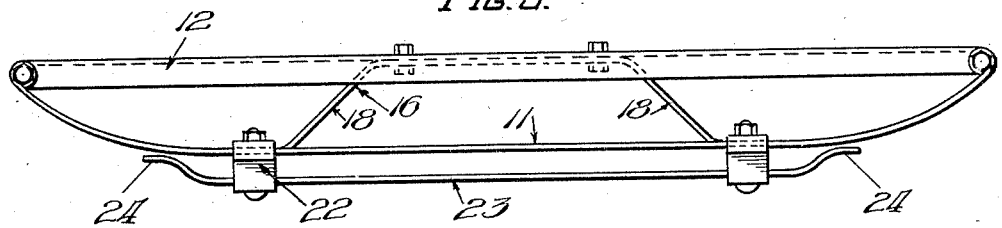
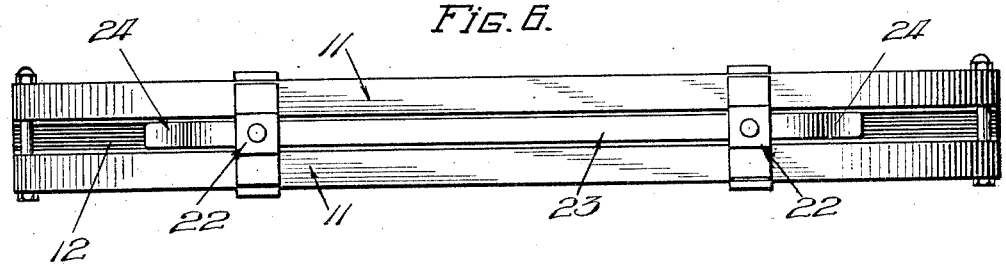
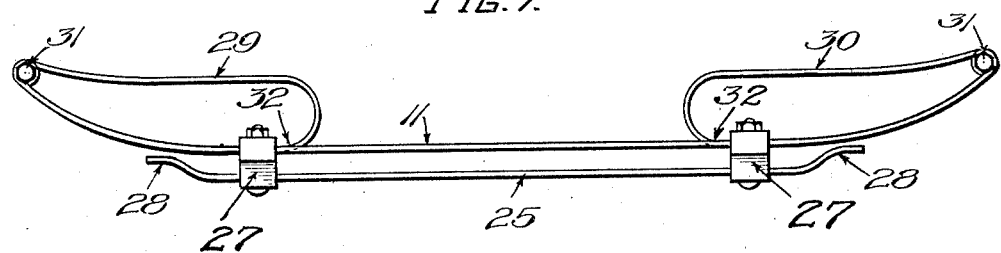
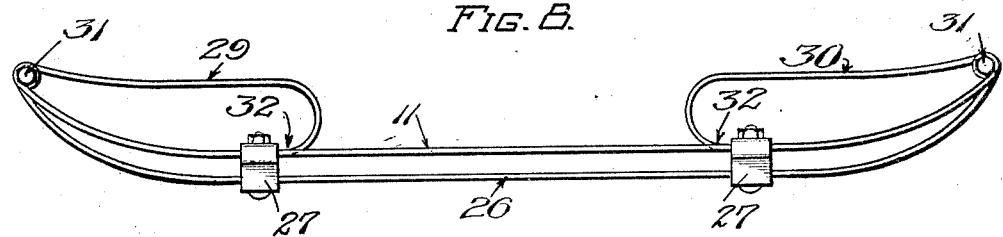

Patented May 6, 1930

1,757,268

UNITED STATES PATENT OFFICE

WILLIAM A. STARCK, OF MILWAUKEE, WISCONSIN, ASSIGNOR TO BADGER MANUFACTURING CORPORATION, OF MILWAUKEE, WISCONSIN, A CORPORATION OF DELAWARE

AUTOMOBILE BUMPER

Application filed February 8, 1928. Serial No. 252,815.

This invention relates to automobile bumpers.

The bumper to which the invention applies in particular has a primary impact bar arranged in front of the secondary impact bars.

An object of the invention is to provide a bumper which has a high capacity for absorbing shocks.

Another object is to provide a bumper which will absorb the shock of a sudden impact without injury to the bumper or to the automobile to which the same is attached.

Another object is to provide a bumper which will distribute a shock throughout the several parts of the bumper and gradually absorb the same.

According to the invention as it is ordinarily embodied, the bumper has an impact bar, which is supported by means connected thereto at the ends and intermediate the ends and the center thereof, and an advance bar spaced forwardly from the impact bar.

Bumpers embodying the invention are illustrated in the accompanying drawings in which the views are as follows:

Figs. 5 and 6 are similar views showing still another form of bumper.

Fig. 7 is a top plan view of a bumper having spring supporting bars.

Fig. 8 is a top plan view of another bumper having spring supporting bars.

Figs. 1 and 2

Figure 1:
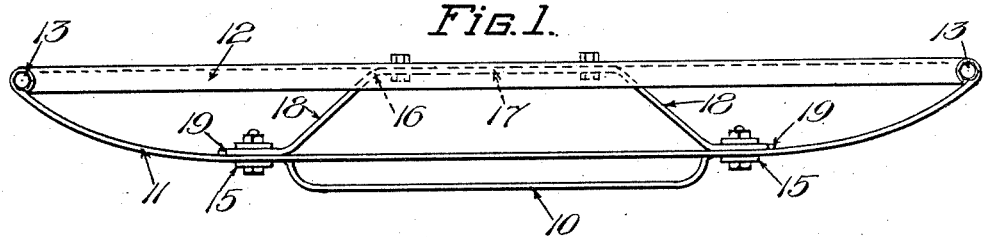
Figs. 1 and 2 are, respectively, a top plan and a front view of a bumper having a rigid supporting bar.

This bumper has an advance or primary impact bar 10, parallel intermediate or secondary bars 11 and a supporting bar 12 of channel cross-section.

The parallel bars 11 are spaced vertically from each other and pivotally connected to the supporting bar 12 by pins 13 which are arranged in the flanges of the supporting bar at the ends thereof.

The bar 10 is spaced forwardly from the bars 11 and has its ends offset rearwardly and connected between the bars 11 by clamps 15.

The parallel bars 11 are further supported from the bar 12 by a brace 16 of spring metal which has a straight central part 17 connected to the web of the bar 12 and diverging arms 18 having the outer ends 19 thereof abutting the ends 14 of the bar 10 and connected to the bars 11 by the clamps 15.

Each arm 18 acts as a brace independently of the other arm 18 and may be separate therefrom instead of being connected thereto by the part 17.

Figs. 3 and 4

Figure 2:
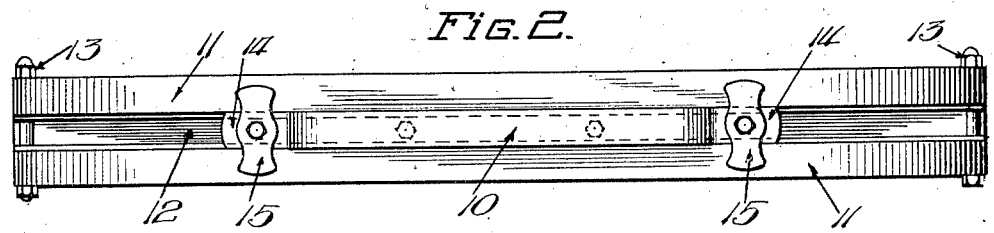

This bumper is similar to the bumper shown in Figs. 1 and 2, with the exception of the advance or primary impact bar and the means for attaching the same, and like parts have been indicated by the same reference numerals.

The advance or primary impact bar 20 extends the entire length of the bumper and is provided at its ends with eyes 21 which embrace the pins 13 intermediate the flanges of the supporting bar 12.

The ends 19 of the brace arms 18 are arranged between the bars 11 and connected thereto by connectors or clamps 22 which also connect the bar 20 to the bars 11 and space the same therefrom.

The clamps 22 maintain the bar 20 in alinement with the space between the bars 11 and transmit shocks received by the bar 20 to the bars 11 and to the brace arms 18.

Figs. 5 and 6

Figure 3:
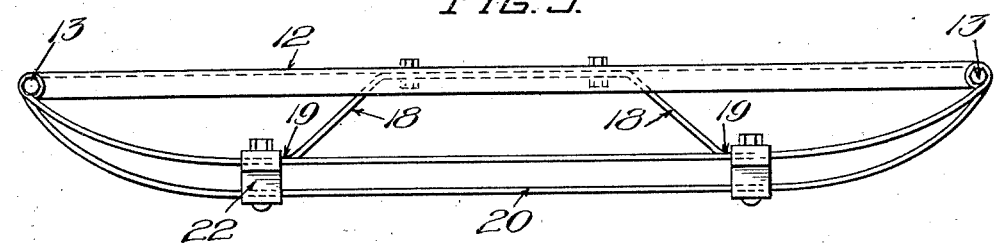
Figs. 3 and 4 are similar views showing another form of bumper.
Figure 4:
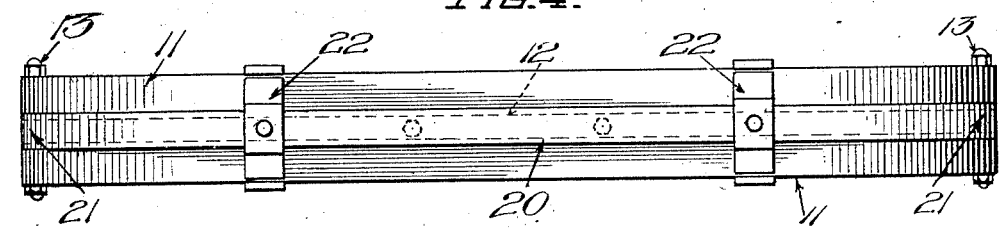

This bumper is the same as the bumper shown in Figs. 3 and 4, with the exception of the advance bar 23, and like parts have been indicated by the same reference numerals.

The advance or primary impact bar 23 is shorter than the advance bar 20 and has its ends 24 offset rearwardly toward, but out of contact with the parallel bars 11.

Figs. 7 and 8

The bumpers shown in Figs. 7 and 8 differ from the bumpers shown in Figs. 5 and 3 in having spring supporting bars and are alike except that the bumper shown in Fig. 7 has an advance bar 25, which is similar to the advance bar 23 shown in Fig. 5, and the bumper shown in Fig. 8 has an advance bar 26 which is similar to the advance bar 20 shown in Fig. 3.

The advance bars 25 and 26 are spaced forwardly from the parallel bars 11 by clamps 27 and the ends 28 of the bar 25 are bent rearwardly out of the plane of the bar.

The clamps 27 are similar to and function in the same manner as the clamps 22 shown in Figs. 3 to 6.

These bumpers have spring supporting bars 29 and 30 which have the outer ends thereof pivotally connected by pins 31 to the ends of the parallel bars 11 and the inner ends 32 thereof bent or curved forwardly and connected to the bars 11 by the clamps 27.

The ends 32 of the bars 29 and 30 assist in supporting the bars 11 and are preferably formed into open loops to permit the same to absorb a greater amount of shock.

The impact bars 11 of the several bumpers described herein are supported at the ends and at points intermediate the ends and the center thereof, thus providing a four-point suspension for the same and four points through which shock may be transferred to the supporting bars.

The brace arms 18 in the forms shown in Figs. 1 to 6 and the looped ends in the forms shown in Figs. 7 and 8 provide resilient connections between the impact members and the supports which assist in absorbing shocks and distribute the same throughout the bumper.

A light shock will be partially absorbed by the advance bar and partially transferred to the other parts of the bumper by the clamps 15, 22 or 27.

A heavier shock will deflect the advance bar between the parallel bars 11 and permit the same to assist in absorbing the shock and in transferring the same to the other parts of the bumper through the braces 18 or ends 32 and through the pins 13 or 31.

An extremely heavy shock received by one of the bumpers shown in Figs. 1 to 6 may deflect the bars 11 against the rigid bar 12 which retards further movement thereof and prevents serious injury to the automobile.

The invention herein set forth is susceptible of other modifications and adaptations without departing from the scope thereof as hereafter claimed.

The invention is claimed as follows:

1. A bumper comprising a rigid supporting bar, spring impact bars connected thereto, and a front bar connected to said impact bars and spaced forwardly therefrom.

2. An automobile bumper comprising a rear supporting bar, spring impact bars pivoted to said supporting bar, and a front bar connected to said impact bars.

3. An automobile bumper comprising a front impact bar, a rear supporting bar pivotally connected thereto, and intermediate parallel bars pivotally connected to said supporting bar.

4. A bumper comprising a rigid supporting bar, spring bars connected thereto, a front bar connected to said spring bars, and a brace between said rear bar and said intermediate bars.

5. A bumper comprising a resilient primary impact bar, resilient secondary impact bars connected thereto and spaced rearwardly therefrom, and a rigid supporting bar connected to said secondary impact bars.

6. A bumper comprising a front impact bar, a rear supporting bar pivoted thereto, intermediate parallel spring bars pivoted to said rear bar, and a brace between said rear and said intermediate bars.

7. A bumper comprising spring impact bars, a spring bar mounted thereon in advance of said bars, a supporting bar pivoted to the ends of said impact bars, and braces arranged between said supporting bar and said impact bars and connected to said impact bars inwardly of the ends of the same.

8. An automobile bumper comprising a primary impact bar, secondary impact bars, supporting means for the latter, connections between said primary and secondary bars, and braces between said supporting means and said secondary bars secured thereto by said connections.

9. An automobile bumper comprising a rear supporting bar, spring bars pivoted to said bar, a front bar spaced forwardly from said spring bars, clamps connecting said front bar and said spring bars, and braces between said rear bar and said spring bars connected to said spring bars by said clamps.

10. An automobile bumper comprising a rear supporting bar, spring bars pivoted to said bar, a front bar having its ends offset out of the plane of the body thereof and clamped to said spring bars with its ends in the plane of said bars, and braces between said rear bar and said spring bars connected thereto by said clamps and contacting the ends of said front bar.

11. An automobile bumper comprising a channel shaped supporting bar, spring bars pivoted to the outer ends thereof, and a front bar also pivoted to the outer ends of said supporting bar and spaced forwardly from said spring bars.

12. An automobile bumper comprising a rear supporting bar, spring bars pivoted to said bar, a front bar connected to said supporting bar, and braces between said rear bar and said spring bars, each of said braces engaging said spring bars between the ends and middle of said bars.

13. An automobile bumper comprising an impact bar, means connected to said bar intermediate the ends thereof and pivoted to said ends to support said bar, an advance bar arranged forwardly of said impact bar, and clamps connecting said advance bar to said impact bar and rigidly spacing the same therefrom.

14. An automobile bumper comprising parallel impact bars, means connected to said bars intermediate the ends thereof and pivoted to said ends to support said bars, an advance bar arranged forwardly of said impact bars, and clamps connecting said advance bar to said impact bars and rigidly spacing the same therefrom.

15. An automobile bumper comprising an impact bar, means connected to said bar at points intermediate the ends and the center thereof and pivoted to said ends to support said bar, and an advance bar spaced forwardly from said impact bar and connected thereto at said points.

16. An automobile bumper comprising parallel impact bars, means connected to said bars at points intermediate the ends and the center thereof and pivoted to said ends to support said bars, and an advance bar spaced forwardly from said impact bars and connected thereto at said points.

17. An automobile bumper comprising two parallel spring bars spaced from each other, means connected to said bars intermediate the ends thereof and pivoted to said ends to support said bars, and an advance spring bar arranged between and spaced forwardly from said parallel bars.

18. An automobile bumper comprising two parallel spring bars spaced from each other, means connected to said bars intermediate the ends thereof and pivoted to said ends to support said bars, and an advance spring bar arranged between and spaced forwardly from said parallel bars and connected thereto.

19. An automobile bumper comprising two parallel spring bars spaced from each other, means connected to said bars intermediate the ends thereof and pivoted to said ends to support said bars, an advance spring bar arranged between and spaced forwardly from said parallel bars, and clamps connecting said advance bar to said parallel bars.

In witness whereof, I have hereunto subscribed my name.

WILLIAM A. STARCK.